United States Patent [19]

Stawski et al.

[11] Patent Number: 4,516,561
[45] Date of Patent: May 14, 1985

[54] PORTABLE BATTERY POWERED BLOWER APPARATUS FOR FANNING CHARCOAL OR OTHER FUEL

[75] Inventors: Karl-Heinz Stawski, Parkdale; Philip W. Jensen, Hood River, both of Oreg.

[73] Assignee: P D Manufacturing, Inc., Hood River, Oreg.

[21] Appl. No.: 428,991

[22] Filed: Sep. 30, 1982

[51] Int. Cl.³ .............................................. A47J 37/00
[52] U.S. Cl. .................................. 126/25 B; 417/411
[58] Field of Search .................... 126/25 B, 25 R, 77, 126/146, 112; 110/1 F; 34/97; 219/222, 227, 229, 366; 417/411

[56] References Cited

U.S. PATENT DOCUMENTS

| | | |
|---|---|---|
| 1,295,907 | 3/1919 | Le Compte . |
| 1,614,785 | 1/1927 | Fraser . |
| 2,192,732 | 3/1940 | Johnson . |
| 2,691,368 | 10/1954 | Hood . |
| 2,727,505 | 12/1955 | Hood . |
| 2,866,883 | 12/1958 | Borden . |
| 2,922,016 | 1/1960 | Persinger . |
| 2,950,669 | 8/1960 | Terry . |
| 2,983,269 | 5/1961 | Montesano . |
| 3,060,868 | 10/1962 | MacLachlan . |
| 3,099,386 | 7/1963 | Pieper . |
| 3,191,566 | 6/1965 | Hottenroth et al. . |
| 3,266,478 | 8/1966 | Booth . |
| 3,334,214 | 8/1967 | Davidson ...................... 126/25 B X |
| 3,347,220 | 10/1967 | Barbera, Sr. . |
| 3,362,586 | 1/1968 | Dedoes ......................... 126/25 B X |
| 3,529,556 | 9/1970 | Barnes . |
| 3,647,323 | 3/1972 | Thomas . |
| 3,697,198 | 10/1972 | Holder, Jr. .................... 126/25 B X |
| 3,797,475 | 3/1974 | Hughes ......................... 126/25 B X |
| 3,982,522 | 9/1976 | Hottenroth et al. . |

Primary Examiner—Larry Jones
Attorney, Agent, or Firm—Klarquist, Sparkman, Campbell, Leigh & Whinston

[57] ABSTRACT

A portable battery powered blower apparatus for fanning charcoal or other fuel is disclosed and includes a compact two-section, hollow housing including an upright body, and a barrel projecting from an upper portion of the body. The body is internally divided into a lower battery receiving compartment, an intermediate blower receiving chamber separated into side-by-side turbine and fan motor chambers, and an upper air flow transition region. A curved tubular conduit carries air from the turbine chamber and through the air flow transition region and to the free end of the barrel. The barrel is provided with internal reinforcing ribs which support the tubular conduit. Also, first and second lips project downwardly from the end of the barrel to engage a rim of a fuel container. The base of the housing is flared and abuts the side wall of the fuel container to position the apparatus for use.

8 Claims, 5 Drawing Figures

FIG. 4
FIG. 5
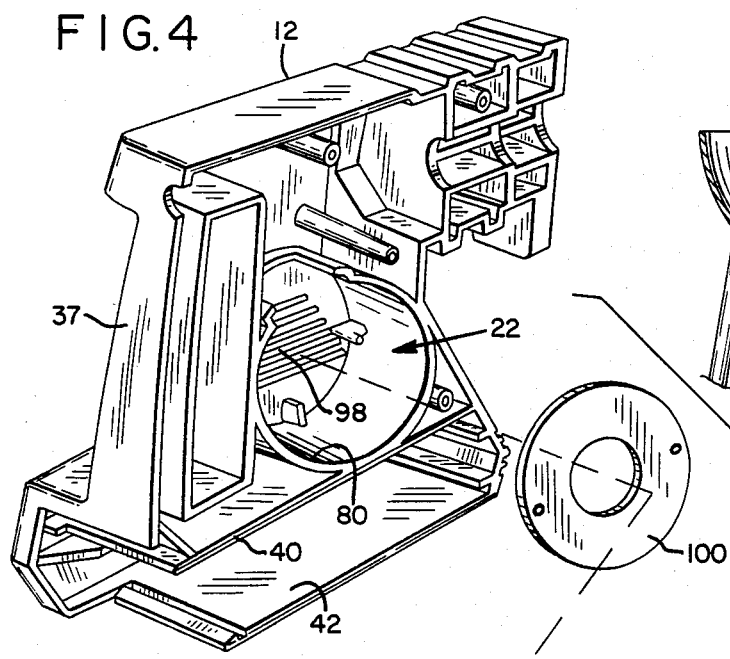
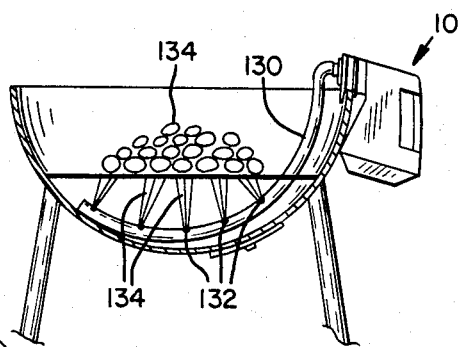
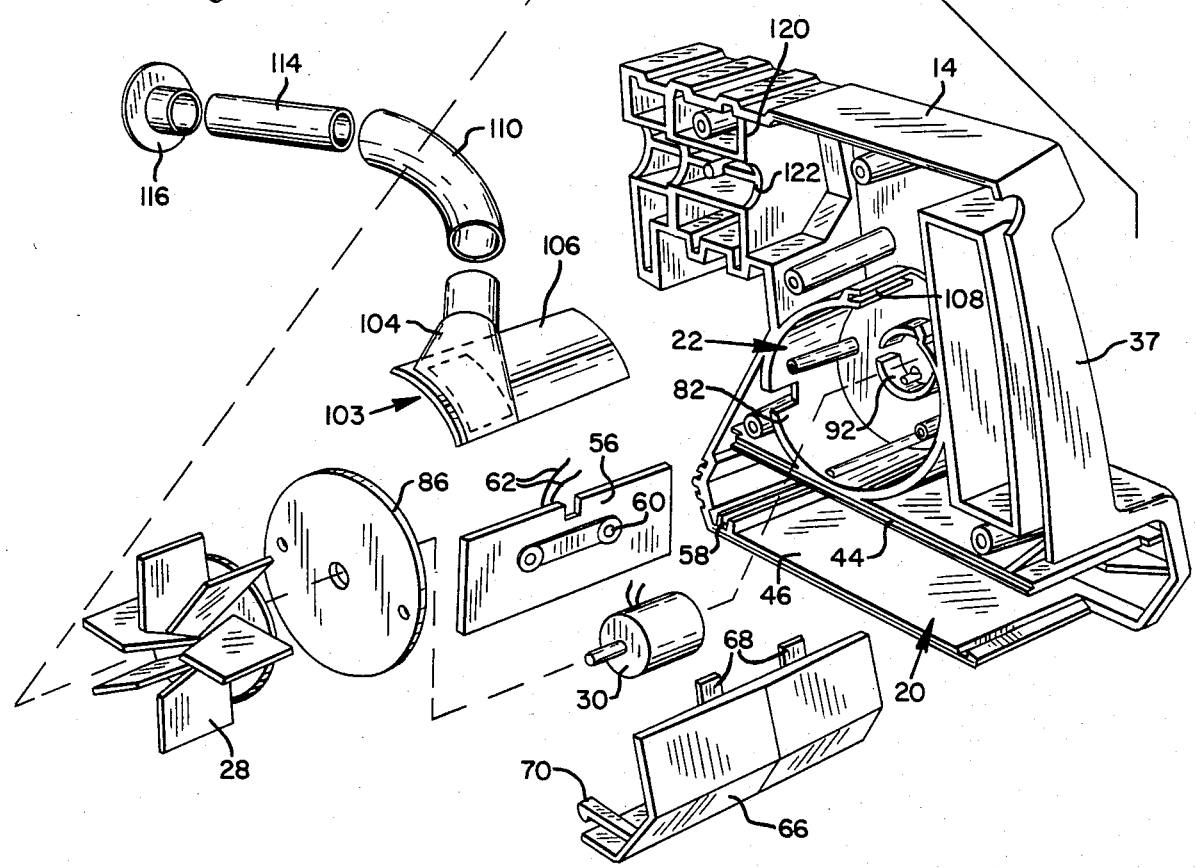

4,516,561

PORTABLE BATTERY POWERED BLOWER APPARATUS FOR FANNING CHARCOAL OR OTHER FUEL

BACKGROUND OF THE INVENTION

The present invention relates to an apparatus for fanning fuel, such as charcoal in a barbecue, and more specifically to a battery powered device for this purpose.

Typically, charcoal briquettes in a barbecue are doused with lighter fluid and then ignited. Following ignition, the briquettes usually commence burning in only a very small area. It is only after the passage of a very substantial amount of time, for example, twenty to forty minutes, that the briquettes are burning sufficiently to allow barbecue cooking to commence.

The time delay between initial ignition and sufficient burning of the briquettes for cooking purposes can be reduced by fanning the fire. This causes the coals to burn much more intensely and rapidly.

Thus, a need exists for a device for fanning ignited fuel which is efficient, economical, easy to use, and portable so that it is easily taken on picnics and other outings.

SUMMARY

A portable battery powered blower apparatus for fanning charcoal or other fuel includes a housing with an upright body and a barrel projecting outwardly from an upward portion of the body. The body includes a lower battery receiving compartment, an intermediate blower receiving chamber with an air inlet and outlet, and an upper air flow transition region. A blower in the intermediate chamber moves air through a curved tubular conduit positioned in the upper air transition region and out the free end of the barrel to the fuel.

It is an object of this invention to provide a novel and unobvious battery powered apparatus for fanning ignited fuel such as charcoal in a barbecue.

It is a still further object of the invention to provide such an apparatus which fans a fire in an efficient manner.

Still another object of the invention is to provide a lightweight portable apparatus for fanning a fire.

Still another object of the invention is to provide such an apparatus which is mechanically simple and economical to construct.

These and other objects, features and advantages of the present invention will become apparent from the following detailed description, which proceeds with reference to the accompanying drawings.

BRIEF DESCRIPTION OF THE DRAWINGS

In the drawings:

FIG. 4 is an exploded view of a blower apparatus in accordance with the invention; and FIG. 5 shows the blower apparatus in operation.

DETAILED DESCRIPTION OF PREFERRED EMBODIMENT

Figure 1:
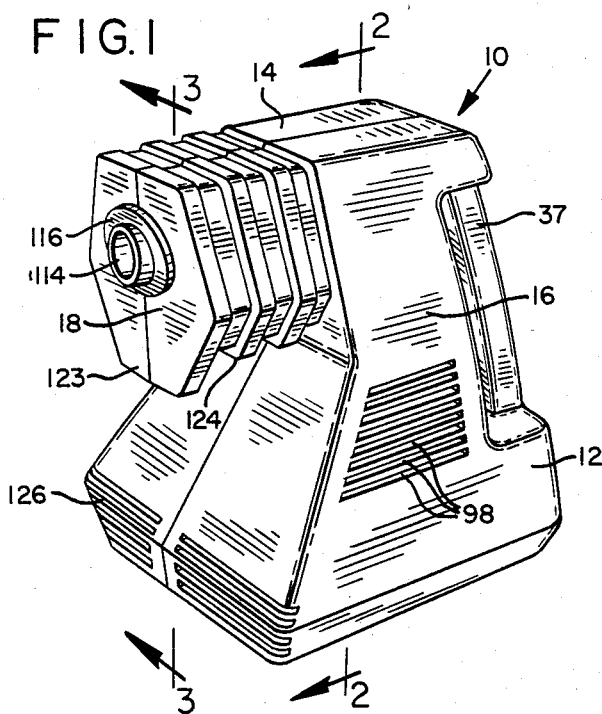
FIG. 1 is a perspective view of a blower apparatus in accordance with the invention.
Figure 3:
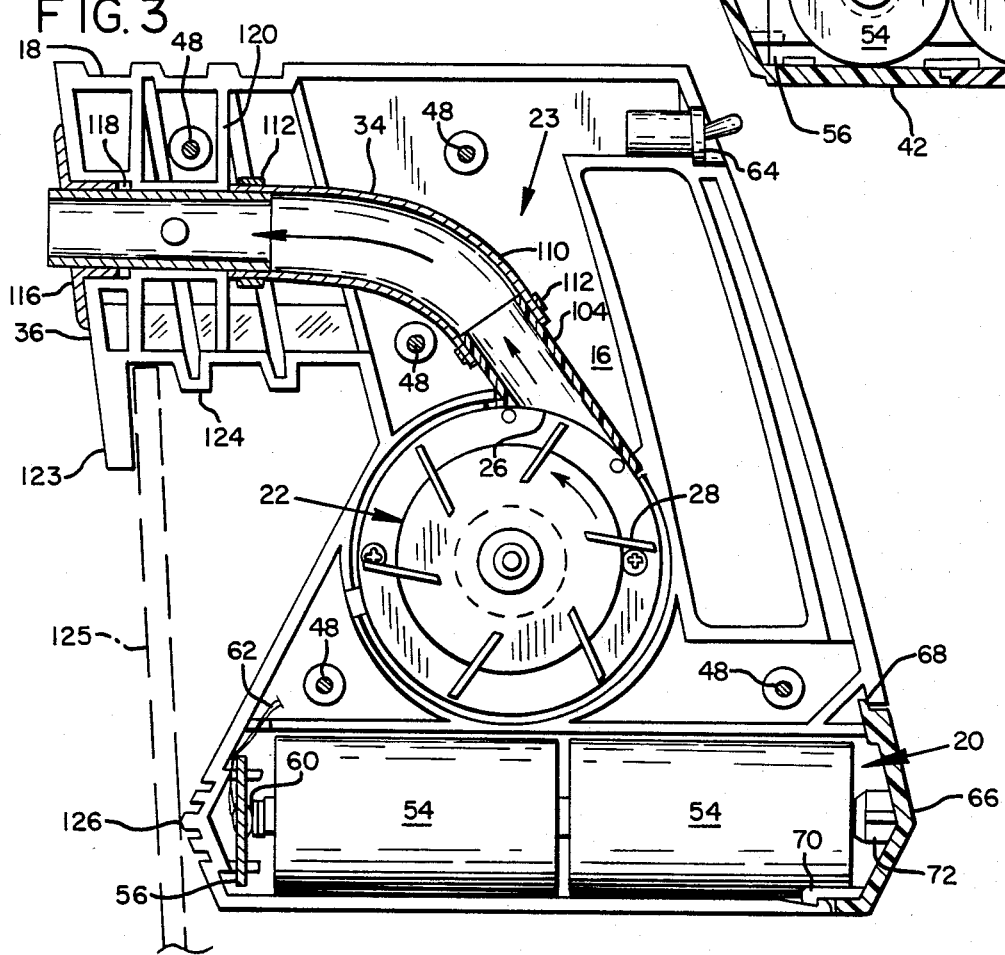
FIG. 3 is a cross-sectional view of a blower apparatus taken along lines 3—3 of FIG. 1, with the rim of a barbecue shown in dashed lines.

With reference to FIGS. 1 and 3, a portable blower apparatus for fanning charcoal or other fuel is shown.

The apparatus includes a hollow housing 10 formed of first and second unitary upright housing sections 12, 14. The housing includes a body 16 and a barrel 18 which projects outwardly from an upper portion of the body. Within body 16, there is provided a lower battery receiving compartment 20 (FIG. 3), an itermediate blower receiving chamber 22 having an air inlet 24 and an air outlet 26, and an upper airflow transition region. A turbine 28 (FIG. 3) driven by a motor 30 (FIG. 2) moves air from the air inlet, through the intermediate blower receiving chamber, and to the air outlet 26. From outlet 26, the air is carried by a curved tubular connector 34 (FIG. 3) through the transition region 23 and out the free end 36 of barrel 18. The housing sections 12, 14 form an upright handle 37 which makes the apparatus easy to carry and position.

Figure 2:
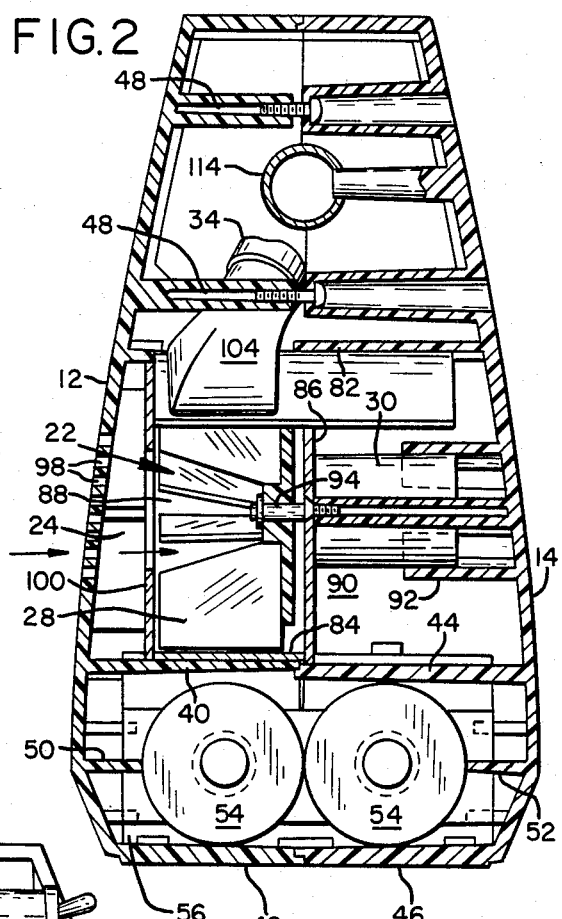
FIG. 2 is a cross-sectional view of a blower apparatus taken along lines 2—2 of FIG. 1.

More specifically, with reference to FIGS. 2, 3 and 4, the battery receiving compartment 20 is formed as follows. The bottom of housing section 12 is closed by a base plate 42 and a generally horizontal battery compartment forming plate 40 is positioned above the base plate. Housing section 14 also includes a base plate 46 with a battery compartment forming plate 44 spaced thereabove it. When these housing sections are assembled and held together, as by screws 48, the plates 40, 44 and 42, 46 engage one another to form the lower battery receiving compartment.

Ribs 50, 52 (FIG. 2) project into the battery receiving compartment and abut batteries 54 horizontally positioned therein to snugly hold them in place. A vertical electrical contact plate 56 is slidingly received within a guideway 58 of housing section 14, at the front end of the battery compartment. Electrical contacts 60 mounted to this plate are coupled by wires 62 to a motor energization switch 64 (FIG. 3). A removable cover 66 is provided with tabs 68 and fingers 70 which snap to housing sections 12, 14 to close the rear end of the battery compartment. Electrical contacts 72 (FIG. 3) mounted to cover 66 complete the electrical circuit from the fan motor to the batteries. Therefore, the batteries are easily removed merely be removing cover 66 in the event they become run down.

Referring to FIG. 4, the intermediate blower receiving chamber is formed as follows. The housing section 12 includes a cylindrical blower chamber wall 80, while housing section 14 includes a similar cylindrical blower chamber wall 82. When the housing sections are assembled, the free edges of these chamber walls engage one another to form the intermediate blower receiving chamber 22. The chamber 22 is of circular cross-section and extends between the sides of the housing sections. An upright annular wall 86 separates chamber 22 into side-by-side turbine receiving chambers 88 and motor receiving chambers 90. Housing section 14 carries a motor mounting bracket 92 which receives and supports the motor 30. A horizontal shaft 94 drivenly connected to the motor, extends through upright wall 86 and into the turbine chamber 88. The turbine 28, positioned within chamber 88, is coupled to the free end of shaft 94 so that it rotates about the axis of the shaft to move the air as previously described.

Because both the shaft 94 and batteries 54 lie in a horizontal plane, the apparatus is of compact height.

Plural air receiving slots 98 are provided adjacent the turbine and through housing section 12. An annular disc positioned between the turbine and slots directs entering air to the center of the turbine.

The curved tubular conduit 34 is of multi-section construction, and will be described with reference to FIGS. 3 and 4. The conduit 34 directs generally upwardly travelling air through the airflow transition region and turns it to flow forwardly from the free end of the barrel. More specifically, conduit 34 includes a first section 103 which comprises an upwardly angled neck 104 mounted to a curved plate 106. Plate 106 is held within a guideway 108 of housing section 14 so that the neck 104 is positioned over the airflow outlet 26. A second or curved transition tubing section 110 is coupled to neck 104. A third or straight tubing section 114 extends between the curved section 110 and a nipple 116 which is inserted into a recess 118 at the free end of the barrel. Suitable fasteners 112 clamp the tubing sections together following assembly.

The barrel 18 is provided with plural internal reinforcing ribs 120 (FIG.4) which terminate at the boundary 122 of an internal passageway which receives the conduit section 114. Thus, the ribs 120 supports the conduit 34 where it passes through the barrel.

As can be seen from FIG. 3, the free end of the barrel includes a first lip 123 which projects downwardly so as to overlap the rim 125 of a fuel container in the event it is desired to support the apparatus by the container. Also, a second lip 124 is provided which is spaced inwardly along the barrel and closer to the body than the first lip. The first and second lips are spaced apart for loose reception of the rim 24 therebetween, with the first and second lips limiting the sliding of the barrel relative to the rim.

Also, as shown in FIG. 3, the lower portion of the body comprises a flared lower base which projects forwardly toward the fuel container. The flared base terminates in a point 126. The flared base pivots about the fuel container rim until point 126 engages the fuel container. This releasably mounts the blower apparatus to the fuel container. As can be seen in FIG. 3, with the apparatus in an upright position, the point or tip 126 is offset inwardly of the inner edge of lip 123 a distance approximately equal to the thickness of the rim. Consequently, when the base portion engages the fuel container, the apparatus is held in an upright position.

The operation of the apparatus is best understood with reference to FIG. 5. Typically, a wand or pipe 130, with plural apertures 132, is coupled to tubing section 114 at the end of the barrel. The wand is positioned underneath briquettes 134. The briquettes are then ignited and the apparatus is turned on to direct air, represented by lines 134, upwardly to the briquettes. This speeds their ignition and reduces the time until the briquettes are ready for use in barbecuing.

Having illustrated and described the principles of my invention with reference to one preferred embodiment, it should be apparent to those persons skilled in the art that such invention may be modified in arrangement and detail without departing from such principals. I claim as my invention all such modifications as come within the true spirit and scope of the following claims.

I claim:

1. A portable battery powered blower apparatus for fanning charcoal or other fuel which is positioned within a rimmed fuel container comprising:

a housing having an upright body and a barrel having one end connected to an upper portion of the body, the barrel projecting outwardly from the upper portion of the body, the projecting portion of the barrel having a free end which is spaced from said one end of the barrel;

said body including a lower battery receiving compartment, an intermediate blower receiving chamber with an air inlet and an air outlet, and an upper air flow transition region;

a curved tubular conduit connected at a first end to the air outlet and having its other or second end supported by the free end of the barrel so as to provide a curved air flow passageway from the intermediate chamber, through the air flow transition region and to the free end of the barrel;

a battery powered fan means positioned within the intermediate chamber for moving air from the air inlet, through the intermediate chamber and the tubular conduit, and from the free end of the barrel to the fuel;

said barrel having a plurality of lips projecting from the free end thereof, whereby the blower may be positioned on the rim of the fuel container during use.

2. An apparatus according to claim 1 in which said body includes an upright wall positioned to separate the intermediate chamber into side-by-side turbine and fan motor chambers, the turbine chamber being provided with the air inlet and air outlet; and said fan means including a battery-powered motor mounted to said body and positioned within the motor chamber, a shaft which is drivenly connected to said motor, said shaft extending through said upright wall and into the turbine chamber, and a turbine positioned within the turbine chamber and mounted to a free end portion of said shaft so as to rotate about the axis of the shaft to move air from the air inlet to the fuel.

3. An apparatus according to claim 1 in which the free end of said barrel includes plural internal reinforcing ribs which terminate so as to define the boundary of an internal conduit receiving passageway, the second end of said tubular conduit being positioned within the passageway and supported by said reinforcing ribs.

4. A portable, battery-powered blower apparatus for fanning charcoal or other fuel which is positioned within a rimmed fuel container, comprising:

a housing with an upright body and a barrel having one end connected to an upper portion of the body, the barrel projecting outwardly from the upper portion of the body, the projecting portion of the barrel having a free end which is spaced from said one end of the barrel, said apparatus defining an air flow passage from an air inlet opening, through the body and the barrel, and to an air outlet opening at the free end of the barrel;

fan means positioned within said body for delivering a stream of air through the air flow passageway to the fuel;

a frist lip projecting downwardly from the free end of said barrel in a position to overlap the rim of the fuel container when the barrel rests on the rim;

said body having a flared lower base portion which projects in the direction of projection of the barrel and toward the fuel container, such base portion pivoting about the rim and into engagement with the fuel container when the lip overlaps the rim so as to releasably mount the blower apparatus to the fuel container; and the free end of the barrel including a downwardly projecting second lip spaced inwardly along the barrel and closer to the body than the first lip, the first and second lips being spaced apart for loose reception of the rim therebetween such that said first and second lips limit sliding of the barrel relative to the rim.

5. An apparatus according to claim 4 in which the projecting base portion is offset vertically inwardly of the inward surface of the first lip a distance approximately equal to the thickness of the rim, such that when the base portion engages the fuel container, the apparatus is held in an upright position.

6. A portable, battery-powered blower apparatus for fanning charcoal or other fuel in a rimmed fuel container comprising:

a hollow housing having an upright body and a barrel projecting outwardly from the upper portion of the body;

said body including a lower battery receiving compartment, an intermediate blower-receiving chamber with an air inlet and an air outlet, and an upper air flow transition region;

said housing section including a first battery compartment forming plate and said second housing section including a second battery compartment forming plate; said first and second plates being sized and positioned such that their free edges engage one another upon interconnection of said housing sections to provide the battery receiving compartment;

said first housing section also including a cylindrical lower chamber wall and said second housing section including a second cylindrical blower chamber wall, said first and second blower chamber walls being secured and positioned such that their free edges engage one another upon interconnection of said housing sections to provide the intermediate blower receiving chamber;

an upright wall positioned to separate the cylindrical blower receiving chamber into side-by-side turbine and fan motor chambers;

a curved tubular conduit connected at a first end to the air outlet and having its other or second end supported by the free end of the barrel so as to provide a curved airflow passageway from the intermediate chamber, through the airflow transition region and to the free end of the barrel;

battery powered fan means positioned within the intermediate chamber for moving air from the air inlet, through the intermediate chamber and the tubular conduit, and out from the free end of the barrel to the fuel;

said fan means including a battery powered motor mounted to one of said first and second housing sections and positioned within the motor chamber, a shaft which is drivenly connected to said motor, said shaft extending through said upright wall and into the turbine chamber, and a turbine positioned within the turbine chamber and mounted to a free end portion of said shaft so as to rotate about the axis of the shaft and move the air to the fuel;

the free end of said barrel defining plural reinforcing strips which terminate at the boundary of an internal cylindrical passageway, the second end of said tubular conduit being positioned within the passageway and supported by said reinforcing ribs;

plural airflow apertures formed in the housing section adajacent the turbine through which air flows to the turbine, through the tubular conduit and to the fuel.

7. An apparatus according to claim 6 including an annular disc positioned between such air flow apertures and the turbine do as to direct the air from the air flow apertures through the central opening of the annular disc and to the central portion of the turbine.

8. An apparatus according to claim 6 which includes a first lip projecting downwardly from the free end of said barrel in a position to overlap the rim of a fuel container when the barrel rests on the rim.

* * * * *

UNITED STATES PATENT AND TRADEMARK OFFICE
CERTIFICATE OF CORRECTION

PATENT NO. : 4,516,561
DATED : May 14, 1985
INVENTOR(S) : Karl-Heinz Stawski et al.

It is certified that error appears in the above-identified patent and that said Letters Patent is hereby corrected as shown below:

Column 4, line 61, "frist" should read -- first --.

Signed and Sealed this

Twenty-fourth Day of December 1985

[SEAL]

Attest:

DONALD J. QUIGG

Attesting Officer

Commissioner of Patents and Trademarks